United States Patent
He et al.

(10) Patent No.: US 8,417,020 B2
(45) Date of Patent: Apr. 9, 2013

(54) METHOD FOR DETECTING THE LINE BROKEN FAULT OF COMMON ELECTRODE LINES OF LCD

(75) Inventors: Xiangfei He, Beijing (CN); Zhilong Peng, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 593 days.

(21) Appl. No.: 12/638,020

(22) Filed: Dec. 15, 2009

(65) Prior Publication Data

US 2010/0158347 A1 Jun. 24, 2010

(30) Foreign Application Priority Data

Dec. 18, 2008 (CN) .......................... 2008 1 0240378

(51) Int. Cl.
*G06K 9/00* (2006.01)

(52) U.S. Cl. .......................... 382/149; 382/141; 345/94

(58) Field of Classification Search .......... 382/141–145, 382/149; 345/94, 96, 208; 324/770, 158.1; 257/59, 72, 88
See application file for complete search history.

(56) References Cited

U.S. PATENT DOCUMENTS

| 5,550,484 | A | * | 8/1996 | Mitsumori et al. | ...... 324/762.09 |
| 5,576,729 | A | * | 11/1996 | Yamazaki | ...... 345/94 |
| 6,340,963 | B1 | | 1/2002 | Anno et al. | |
| 6,401,551 | B1 | * | 6/2002 | Kawahara et al. | ....... 73/862.337 |
| 7,466,161 | B2 | * | 12/2008 | Gardner et al. | ........... 324/760.01 |
| 7,821,512 | B2 | * | 10/2010 | Yi | ................ 345/211 |
| 2002/0044229 | A1 | * | 4/2002 | Kim | ................ 349/43 |
| 2003/0117164 | A1 | | 6/2003 | Fujii et al. | |
| 2004/0113879 | A1 | * | 6/2004 | Sekiguchi et al. | ............. 345/94 |
| 2007/0114918 | A1 | * | 5/2007 | Arai et al. | .................. 313/504 |

FOREIGN PATENT DOCUMENTS

| CN | 1247999 C | 3/2006 |
| JP | 2008-171000 A | 7/2008 |

\* cited by examiner

*Primary Examiner* — Sang Nguyen

(74) *Attorney, Agent, or Firm* — Ladas & Parry LLP

(57) ABSTRACT

A method for detecting line broken faults of common electrode lines of liquid crystal display comprising: loading detection picture to the liquid crystal display, wherein said detection picture comprises at least one detection picture for line broken of common electrode lines, wherein, in the detection picture of same frame, the voltage difference of storage capacitor corresponding to pixel electrode with one polarity is larger than voltage difference of a storage capacitor corresponding to pixel electrode with another polarity; when the detection picture for line broken of common electrode line is displayed on the liquid crystal display, detecting whether there is black line or white line gradually changed in horizontal direction in said detection picture for line broken of common electrode line, and determining line broken fault of common electrode line exists in the liquid crystal display when there is a black line or white line gradually changed in horizontal direction.

13 Claims, 5 Drawing Sheets

21 — loading a detection picture to a liquid crystal display, wherein said detection picture comprises at least one detection picture for line broken of common electrode lines, in the detection picture of the same frame under the normal white mode, the first and second pixel electrode voltages are applied to the pixel electrodes with negative and positive polarities, respectively 22 — detecting whether there is a black line or white line gradually changed in horizontal direction in said detection picture for line broken of common electrode line

31 — loading a detection picture to a liquid crystal display, wherein said detection picture comprises at least one detection picture for line broken of common electrode lines, in the detection picture of the same frame under the normal black mode, the first and second pixel electrode voltages are applied to the pixel electrodes with negative and positive polarities, respectively 32 — detecting whether there is a black line or white line gradually changed in horizontal direction in said detection picture for line broken of common electrode line

Fig. 7

```
41 ─── loading a detection picture to a
        liquid crystal display, wherein
        said detection picture comprises at
        least one detection picture for line
        broken of common electrode lines,
        in the detection picture of the
        same frame under the normal
        black mode, the first and second
        pixel electrode voltages are
        applied to the pixel electrodes
        with positive and negative
42 ───  polarities, respectively
                    ↓
        detecting whether there is a black
        line or white line gradually
        changed in horizontal direction in
        said detection picture for line
        broken of common electrode line
```

Fig. 8

METHOD FOR DETECTING THE LINE BROKEN FAULT OF COMMON ELECTRODE LINES OF LCD

BACKGROUND

1. Field of the Invention

The present invention relates to a detecting method for a Liquid Crystal Display (LCD), and in particular to a method for detecting line broken fault of common electrode lines of the LCD.

2. Discussion of the Background

A Liquid Crystal Display (LCD) having such features as small volume, low power consumption and no radiation is now occupied the leading position in the field of flat panel display. The main body structure of liquid crystal display comprises a array substrate and a color filter substrate paired each other and having a liquid crystal interposed therebetween, wherein a gate line providing scan signal, a data line providing data signal, a pixel electrode forming the pixel dot and common electrode lines providing common voltages are formed over the array substrate, and black matrix and color resin are formed on the color filter substrate.

In order to ensure the quality of the product, after the liquid crystal display is formed by pairing the array substrate and the color filter substrate, it need to make a gray picture detection so as to detect the related defects and make appropriate repairs. Defects in liquid crystal display include pixel dots fault and line broken fault, while the line broken fault is further classified as line broken fault of gate lines, line broken fault of data lines and line broken fault of common electrode lines. It shows from the utility in practice that it is difficult for the picture detection method in the related art to detect the line broken fault of common electrode lines, which results in not only the waste of the raw materials in the subsequent process, but also results the quality degradation when used by the consumer.

FIG. 10 is a schematic diagram illustrating a structure of the common electrode lines on the array substrate in the related art, which is a typical array substrate structure of a storage Capacitor On Common electrode line (Cst On Common), and the common electrode line is of mesh structure. The mesh structure of the common electrode line is a structure commonly adopted in the related art, especially for the product with a big size, in order to make the common electrode signal more uniform, the common electrode adopted a form of inputting from two ends. It is appreciated that the voltages at any point on the common electrode line with the mesh structure are equal to a common electrode voltage Vcom externally applied on the common electrode line. As shown in FIG. 10, common electrode line 1 overlaps with pixel electrode 2, and the storage capacitor is formed at each overlapped place. In operation, common electrode voltage Vcom is not equal to the pixel electrode voltage Vpx1 applied on the pixel electrode. A part of the electronic charge would charge the storage capacitor according to the capacitor effect due to the existing of the storage capacitor, which causes the change in the voltage along with the common electrode line. When line broken occurs at some point at the common electrode line, the transmission mechanism of both ends of the common electrode line is destroyed at the line broken, and the common electrode signal on the common electrode line with line broken would introduce difference as compared with that of other common electrode line without line broken. In particular, as for a product of a liquid crystal screen with m pixels (m is a positive integer) in one direction of the common electrode line, it is assumed that line broken happens at the n-th pixel (n is an positive integer, n<m) in one common electrode line, that is, signals of both sides at the line broken of the common electrode line are transmitted through a single end, wherein the load of the longer end has a length of n (assuming m/2<n) pixels, while the load of both side of the normal common electrode line could be considered as m/2 since it uses the signal transmission mechanism of two ends; therefore a difference is generated between the common electrode line with line broken and the normal common electrode line. However, in fact, under various detection of gray picture in the prior art, the detected picture difference caused by the line broken of common electrode line is very small, even unable to be recognized.

SUMMARY

An embodiment of the present invention is to provide a method for detecting line broken faults of common electrode lines of a liquid crystal display, efficiently solving the technical problem that the line broken faults of common electrode lines could not be detected by the prior art.

An embodiment of the present invention provides a method for detecting line broken faults of common electrode lines of a liquid crystal display, comprising:

step 1, loading a detection picture to a liquid crystal display, wherein said detection picture comprises at least one detection picture for line broken of common electrode lines, which has following features: in the detection picture of the same frame, the voltage difference of a storage capacitor corresponding to a pixel electrode with one polarity is larger than a voltage difference of a storage capacitor corresponding to a pixel electrode with another polarity;

step 2, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

Said detection picture for line broken of common electrode line has following features: in the detection picture of the same frame under the normal white mode, a first pixel electrode voltage is applied to the pixel electrode with positive polarity, and a second pixel electrode voltage is applied to the pixel electrode with negative polarity, and |the first pixel electrode voltage-common electrode voltage|>|the second pixel electrode voltage-common electrode voltage|.

Said detection picture for line broken of common electrode line could also have following features: in the detection picture of the same frame under the normal white mode, a first pixel electrode voltage is applied to the pixel electrode with negative polarity, and a second pixel electrode voltage is applied to the pixel electrode with positive polarity, and |the first pixel electrode voltage-common electrode voltage|>|the second pixel electrode voltage-common electrode voltage|.

Said detection picture for line broken of common electrode line could further have following features: in the detection picture of the same frame under the normal black mode, a second pixel electrode voltage is applied to the pixel electrode with positive polarity, and a first pixel electrode voltage is applied to the pixel electrode with negative polarity, and |the first pixel electrode voltage-common electrode voltage|>|the second pixel electrode voltage-common electrode voltage|.

Said detection picture for line broken of common electrode line could further have following features: in the detection picture of the same frame under the normal black mode, a second pixel electrode voltage is applied to the pixel electrode with negative polarity, and a first pixel electrode voltage is applied to the pixel electrode with positive polarity, and |the first pixel electrode voltage-common electrode voltage|>|the second pixel electrode voltage-common electrode voltage|.

On the basis of the above technical solution, the relationship between the first pixel electrode voltage and the second pixel electrode voltage is: |the first pixel electrode voltage-common electrode voltage|=(1.5~3.5)×|the second pixel electrode voltage-common electrode voltage|. Preferably, the relationship between the first pixel electrode voltage and the second pixel electrode voltage is: |the first pixel electrode voltage-common electrode voltage|=2×|the second pixel electrode voltage-common electrode voltage|.

An embodiment of the present invention provides a method for detecting line broken faults of common electrode lines of a liquid crystal display, which strengthens the change in the common electrode signal of the common electrode line by controlling the gray levels of the pixel electrodes with different polarities based on the polarity inversion mode of the pixel electrodes. In particular, according to an embodiment of the present invention, in the same detection picture for line broken of common electrode line, a first pixel electrode voltage is applied to the pixel electrode with one polarity, and a second pixel electrode voltage is applied to the pixel electrode with another polarity, such that one of the overall strength for charge and overall strength for discharge is increased and the other is decreased. Therefore, affected by the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily to be recognized. The line broken fault of common electrode lines could be effectively detected by adopting the method for detecting line broken faults of common electrode lines of the liquid crystal display according to embodiments of the present invention, such that could not only ensure being repaired in time and being processed by classification, but also avoid the waste of the subsequent process and materials, and further prevent the quality from degradation when used by the consumer.

BRIEF DESCRIPTION OF THE DRAWINGS

FIG. 3 is a schematic diagram of detection picture for line broken of common electrode lines in the first embodiment of the method for detecting line broken faults of common electrode lines of the liquid crystal display;

FIG. 4 is a flow diagram illustrating a second embodiment of the method for detecting line broken faults of common electrode lines of the liquid crystal display;

FIG. 5 is a schematic diagram of detection picture for line broken of common electrode lines in the second embodiment of the method for detecting line broken faults of common electrode lines of the liquid crystal display;

FIG. 6 is a flow diagram illustrating a third embodiment of the method for detecting line broken faults of common electrode lines of the liquid crystal display;

FIG. 7 is a schematic diagram of detection picture for line broken of common electrode lines in the third embodiment of the method for detecting line broken faults of common electrode lines of the liquid crystal display;

FIG. 8 is a flow diagram illustrating a fourth embodiment of the method for detecting line broken faults of common electrode lines of the liquid crystal display;

DETAILED DESCRIPTION OF THE PREFERRED EMBODIMENTS

The technical solutions of the present invention are further described in details below with reference to the attached figures and embodiments.

Figure 1:
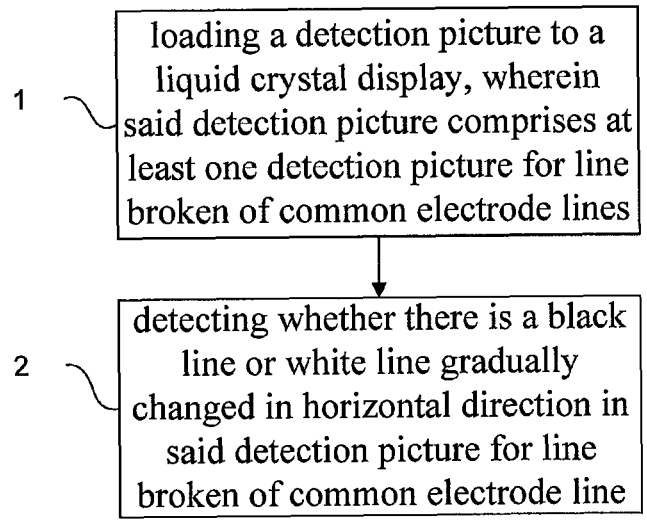
FIG. 1 is a flow diagram illustrating a method for detecting line broken faults of common electrode lines of a liquid crystal display according to an embodiment of the present invention.

FIG. 1 is a flow diagram illustrating a method for detecting line broken faults of common electrode lines of the liquid crystal display according to an embodiment of the present invention, including:

step 1, loading a detection picture to a liquid crystal display, wherein said detection picture comprises at least one detection picture for line broken of common electrode lines, which has following features: in the detection picture of the same frame, the voltage difference of a storage capacitor corresponding to a pixel electrode with one polarity is larger than a voltage difference of a storage capacitor corresponding to a pixel electrode with another polarity;

step 2, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

After deep research by the inventor to the prior art and to the mechanism of attenuation of common electrode signal in the common electrode line, the inventor found that the fact that the current technology could not detect the line broken fault of common electrode line is caused by the small difference between the voltage difference of charge and the voltage difference of discharge for the storage capacitor. The charge of the storage capacitor means: the storage capacitor is charged when the pixel electrode voltage applied to the pixel electrode is higher than the common electrode voltage applied to the common electrode line, which is referred to as positive polarity pixel electrode. The difference value between the pixel electrode voltage Vpx1 applied to the pixel electrode and the common electrode voltage Vcom is charging voltage difference A, with the charging voltage difference A=|Vpx1−Vcom1|; the discharge of the storage capacitor means: the storage capacitor is discharged when the pixel electrode voltage applied to the pixel electrode is lower than the common electrode voltage applied to the common electrode line, which is referred to as negative polarity pixel electrode. The difference value between the pixel electrode voltage Vpx1 applied to the pixel electrode and the common electrode voltage Vcom is so called discharging voltage difference B with the discharging voltage difference B=|Vpx1−Vcom|. Both of charge and discharge effect to the common electrode signal, but in a opposite way, namely, charge would increase the common electrode signal while discharge would decrease the common electrode signal. Therefore, it is possible to change the common electrode signal by changing the magnitude relationship between the charging voltage difference A and discharging voltage difference B, so as to change the signals of the common electrode signal with line broken and normal common electrode. However, when using the current gray picture detection, the number of the positive polarity pixel electrode and the number of the negative polarity pixel electrode are equal in the same picture, thereby in any gray picture within gray level L0~L255, the charging pixel electrodes and the discharging pixel electrodes are equal in number with respect to the storage capacitor. In the prior art, since the voltage of the positive polarity pixel electrode and the voltage of the negative polarity pixel electrode are symmetrical with respect to the common electrode voltage, i.e., |voltage of the positive polarity pixel electrode−common electrode voltage|=|voltage of the negative polarity pixel electrode−common electrode voltage |, the charging voltage difference A and the discharging voltage difference B are very close in actual detection, such that the difference between the common electrode signal with line broken and the signal of normal common electrode is not enough to be displayed, which is exhibited very weak during the detection for gray picture, even unable to be recognized.

It shows by the above analysis that the detection for the line broken of the common electrode line depends on the difference value between the common electrode line with line broken and the common electrode line without line broken, that is, depends on the relationship between the charging voltage difference and the discharging voltage difference. Therefore, an embodiment of the present invention proposes a method for detecting line broken faults of common electrode lines of the liquid crystal display, which has following features: in the same picture, the charging voltage difference A=|Vpx1−Vcom| during the charge of the storage capacitor is set to be not equal to the discharging voltage difference B=|Vpx1−Vcom| during the discharge of the storage capacitor, that is, enlarging the difference between the charging voltage difference A and the discharging voltage difference B on the common electrode line. In the detecting picture in the same frame, the first pixel electrode voltage is applied to the pixel electrode with one polarity, and the second pixel electrode voltage is applied to the pixel electrode with another polarity, meanwhile, |the first pixel electrode voltage−common electrode voltage|>|the second pixel electrode voltage−common electrode voltage|. In the same picture, the overall strength for charge could be increased and the overall strength for discharge could be decreased, or the overall strength for discharge could be increased and the overall strength for charge could be decreased. With the capacitor effect between the pixel electrode and the common electrode line, the difference of the common electrode signal at line broken of the common electrode line comparing to that of the other common electrode lines without line broken would be increased by increasing the charging overall strength or the discharging overall strength, so that the difference can be exhibited and recognized.

The technical solution of the present invention is further described by certain embodiments.

The First Embodiment

Figure 2:
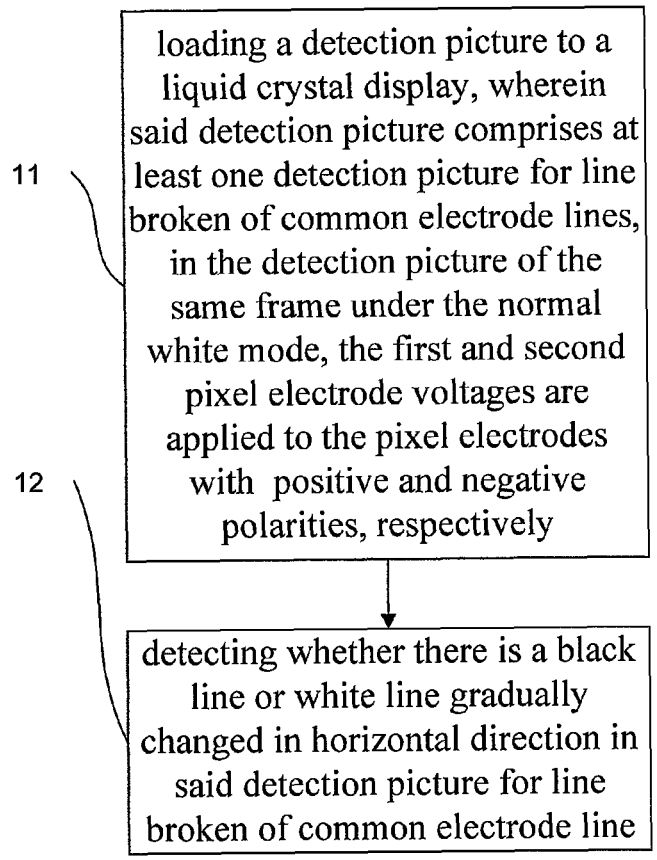
FIG. 2 is a flow diagram illustrating a first embodiment of the method for detecting line broken faults of common electrode lines of the liquid crystal display.

FIG. 2 is a flow diagram illustrating a first embodiment of the method for detecting line broken faults of common electrode lines of the liquid crystal display, including:

step 11, loading a detection picture to a liquid crystal display, wherein said detection picture comprises at least one detection picture for line broken of common electrode lines, which has following features: in the detection picture of the same frame under the normal white mode, the first pixel electrode voltage V1 is applied to the pixel electrode with positive polarity, and the second pixel electrode voltage V2 is applied to the pixel electrode with negative polarity, |the first pixel electrode voltage V1−common electrode voltage Vcom|>|the second pixel electrode voltage V2−common electrode voltage Vcom| with respect to the common electrode voltage Vcom;

step 12, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

The present embodiment is a method, wherein the detection is performed for the line broken faults of common electrode lines under the normal white mode. First, loading a detection picture to the liquid crystal display, wherein said detection picture comprises at least one detection picture for line broken of common electrode lines, which could effectively detect the line broken fault of the common electrode lines. In particular, said detection picture for line broken of common electrode line has the following features: in the detection picture of the same frame, the first pixel electrode voltage V1 is applied to the pixel electrode with positive polarity, and the second pixel electrode voltage V2 is applied to the pixel electrode with negative polarity, |the first pixel electrode voltage V1−common electrode voltage Vcom|>|the second pixel electrode voltage V2−common electrode voltage Vcom| with respect to the common electrode voltage Vcom. Finally, determining whether the detection picture for line broken of common electrode line becomes abnormal, if so, it shows that line broken fault of common electrode line exists in the liquid crystal display, if not, it shows that line broken fault of common electrode line does not exist in the liquid crystal display. Said abnormal described in the present embodiment represents that a black line or white line gradually changed in horizontal direction appears in the detection picture for line broken of common electrode line, or the case where one half is white line gradually changed in horizontal direction and the other half is black line gradually changed in horizontal direction along the same pixel row.

In the above technical solution of the present embodiment, the voltage difference between the first pixel electrode voltage V1 and the common electrode voltage Vcom is the charging voltage difference A of the storage capacitor corresponding to the pixel electrode with positive polarity, the voltage difference between the second pixel electrode voltage V2 and the common electrode voltage Vcom is the discharging voltage difference B of the storage capacitor corresponding to the pixel electrode with negative polarity. Since the charging voltage difference A is larger than the discharging voltage difference B, that is, the overall strength for charge is increased and the overall strength for discharge is decreased in the same detection picture for line broken of common electrode line, with the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily recognized.

In the above technical solution of the present embodiment, the difference value between the charging voltage difference A and the discharging voltage difference B should be made as large as possible, preferably, one could set that charging voltage difference A=(1.5~3.5)×discharging voltage difference B, at this time, the gray level presented by the pixel electrode with positive polarity is L0~L130, while the gray level presented by the pixel electrode with negative polarity is L63~L150. Further preferably, charging voltage difference A=2×discharging voltage difference B, at this time, the gray level presented by the pixel electrode with positive polarity is L0, while the gray level presented by the pixel electrode with negative polarity is L100.

FIG. 3 is a schematic diagram of detection picture for line broken of common electrode lines in the first embodiment of the method for detecting line broken faults of common electrode lines of the liquid crystal display. As shown in FIG. 3, the detection picture for line broken of common electrode line in the present embodiment is a type of "the mode of polarity reversed each two rows, each column, and each frame". With respect to the same pixel column such as the red pixel R of the first column, the first pixel row L1 and the second pixel row L2 have the same positive polarity, while the third pixel row L3 and the fourth pixel row L4 have the same negative polarity; with respect to the same pixel row such as the fifth pixel row L5 or the sixth pixel row L6, the red pixel R of the first column is the positive polarity, the green pixel G of the second column is the negative polarity, and the blue pixel B of the third column is the positive polarity; the polarity of each pixel electrode in the present frame is to be changed in the next frame. For example, the red pixel R of the first column in the seventh pixel row L7 and the eighth pixel row L8 is negative polarity in the present frame, which would change to positive polarity in the next frame. Since the overall strength for charge is increased and the overall strength for discharge is decreased in the present embodiment, a first pixel electrode voltage V1 is applied to the pixel electrode with positive polarity, and |the first pixel electrode voltage V1-common electrode voltage Vcom| is larger, such that the gray level presented by the pixel electrode with positive polarity are L0~L130, thus the pixel electrode with positive polarity in the picture of the present frame are all displayed as more black or fully black, for example, in the ninth pixel row L9 and the tenth pixel row L10, red pixel R of the first column, the blue pixel B of the third column, and the green pixel G of the fifth column and so on are all displayed more black or fully black. In the picture of the present frame, a second pixel electrode voltage V2 is applied to the pixel electrode with negative polarity, such that the gray level presented by the pixel electrode with negative polarity are L63~L150, thus the pixel electrode with negative polarity is displayed in a color with a certain gray level, for example, in the ninth pixel row L9 and the tenth pixel row L10, the green pixel G of the second column is still displayed in green, the red pixel R of the fourth column is still displayed in red, and the blue pixel B of the sixth column is still displayed in blue and so on.

In practice, various methods could be used to achieve the technical solution of the first embodiment of the present invention. For example, one or more detection pictures library could be set firstly, and the detection picture for line broken of common electrode line in the embodiment of the present invention is added into the detection pictures library. When detection is being performed, the detection pictures library is read and each detection picture is loaded sequentially into the liquid crystal display to be detected, so as to be displayed. If the liquid crystal display to be detected has line broken fault of the common electrode line, when the liquid crystal display to be detected displays the detection picture for line broken of common electrode line of the embodiment of the present invention, the black line or white line gradually changed in horizontal direction would appear in the detection picture for line broken of common electrode line, or there is the case where one half is white line gradually changed in horizontal direction and the other half is black line gradually changed in horizontal direction along the same pixel row, thereby it can be easily recognized. If the liquid crystal display to be detected does not have line broken fault of the common electrode line, the abnormal situation would not happen when the liquid crystal display to be detected displays the detection picture for line broken of common electrode line. In addition, each of the other detection pictures in the detection pictures library is still set according the method of the prior art, wherein the pixel electrode voltage in the detection pictures still conducts the polarity inversion according to the symmetric manner with respect to the common electrode voltage.

The Second Embodiment

FIG. 4 is a flow diagram illustrating a second embodiment of the method for detecting line broken faults of common electrode lines of the liquid crystal display, including:

step 21, loading a detection picture to a liquid crystal display, wherein said detection picture comprises at least one detection picture for line broken of common electrode lines, which has following features: in the detection picture of the same frame under the normal white mode, the first pixel electrode voltage V1 is applied to the pixel electrode with negative polarity, and the second pixel electrode voltage V2 is applied to the pixel electrode with positive polarity, |the first pixel electrode voltage V1-common electrode voltage Vcom|>|the second pixel electrode voltage V2-common electrode voltage Vcom| with respect to the common electrode voltage Vcom;

step 22, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

The present embodiment is another method wherein the detection is performed for the line broken faults of common electrode lines under the normal white mode, the flow of the technical solution of the present embodiment is substantially same as aforementioned first embodiment, however, in present embodiment, the first pixel electrode voltage V1 is applied to the pixel electrode with negative polarity, and the second pixel electrode voltage V2 is applied to the pixel electrode with positive polarity, |the first pixel electrode voltage V1-common electrode voltage Vcom|>|the second pixel electrode voltage V2-common electrode voltage Vcom| with respect to the common electrode voltage Vcom.

In the above technical solution of the present embodiment, the voltage difference between the first pixel electrode voltage V1 and the common electrode voltage Vcom is the discharging voltage difference B of the storage capacitor corresponding to the pixel electrode with negative polarity, the voltage difference between the second pixel electrode voltage V2 and the common electrode voltage Vcom is the charging voltage difference A of the storage capacitor corresponding to the pixel electrode with positive polarity. Since the discharging voltage difference B is larger than the charging voltage difference A, that is, the overall strength for discharge is increased and the overall strength for charge is decreased in the same detection picture for line broken of common electrode line, with the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily recognized.

In the above technical solution of the present embodiment, the difference value between the discharging voltage difference B and the charging voltage difference A should be made as large as possible, preferably, one could set that discharging voltage difference B=(1.5~3.5)×charging voltage difference A, at this time, the gray level presented by the pixel electrode with negative polarity is L0~L130, while the gray level presented by the pixel electrode with positive polarity is L63~L150. Further preferably, discharging voltage difference B=2×charging voltage difference A, at this time, the gray level presented by the pixel electrode with negative polarity is L0, while the gray level presented by the pixel electrode with positive polarity is L100.

FIG. 5 is a schematic diagram of detection picture for line broken of common electrode lines in the second embodiment of the method for detecting line broken faults of common electrode lines of the liquid crystal display. As shown in FIG. 5, the detection picture for line broken of common electrode line in the present embodiment is a type of "the mode of polarity reversed each two rows, each column, and each frame". For example, with respect to the same pixel column such as the red pixel R of the first column, the first pixel row L1 and the second pixel row L2 have the same positive polarity, while the third pixel row L3 and the fourth pixel row L4 have the same negative polarity; with respect to the same pixel row such as the fifth pixel row L5 or the sixth pixel row L6, the red pixel R of the first column is the positive polarity, the green pixel G of the second column is the negative polarity, and the blue pixel B of the third column is the positive polarity; the polarity of each pixel electrode in the present frame would be changed in the next frame, for example, the red pixel R of the first column in the seventh pixel row L7 and the eighth pixel row L8 is negative polarity in the present frame, which would change to positive polarity in the next frame. Since the overall strength for discharge is increased and the overall strength for charge is decreased in the present embodiment, a first pixel electrode voltage V1 is applied to the pixel electrode with negative polarity, and |the first pixel electrode voltage V1-common electrode voltage Vcom| is larger, such that the gray level presented by the pixel electrode with negative polarity is L0~L130, thus the pixel electrode with negative polarity in the picture of the present frame are all displayed as more black or fully black, for example, in the ninth pixel row L9 and the tenth pixel row L10, the green pixel G of the second column, the red pixel R of the fourth column, and the blue pixel B of the sixth column and so on are all displayed more black or fully black. In the picture of the present frame, a second pixel electrode voltage V2 is applied to the pixel electrode with positive polarity, such that the gray level presented by the pixel electrode with positive polarity is L63~L150, thus the pixel electrode with positive polarity is displayed in a color with a certain gray level, for example, in the ninth pixel row L9 and the tenth pixel row L10, the red pixel R of the first column is still displayed in red, the blue pixel B of the third column is still displayed in blue, and the green pixel G of the fifth column is still displayed in green and so on. The implement method of the present embodiment is substantially the same as aforementioned first embodiment, with details omitted.

The Third Embodiment

FIG. 6 is a flow diagram illustrating a third embodiment of the method for detecting line broken faults of common electrode lines of the liquid crystal display, including:

step 31, loading a detection picture to a liquid crystal display, wherein said detection picture comprises at least one detection picture for line broken of common electrode lines, which has following features: in the detection picture of the same frame under the normal black mode, the second pixel electrode voltage V2 is applied to the pixel electrode with positive polarity, and the first pixel electrode voltage V1 is applied to the pixel electrode with negative polarity, |the first pixel electrode voltage V1-common electrode voltage Vcom|>|the second pixel electrode voltage V2-common electrode voltage Vcom| with respect to the common electrode voltage Vcom;

step 32, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

The present embodiment is method wherein the detection is performed for the line broken faults of common electrode lines under the normal black mode. First, loading a detection picture to the liquid crystal display, wherein said detection picture comprises at least one detection picture for line broken of common electrode lines, which could effectively detect the line broken fault in the common electrode lines. In particular, said detection picture for line broken of common electrode line has the following features: in the detection picture of the same frame, the second pixel electrode voltage V2 is applied to the pixel electrode with positive polarity, and the first pixel electrode voltage V1 is applied to the pixel electrode with negative polarity, |the first pixel electrode voltage V1-common electrode voltage Vcom|>|the second pixel electrode voltage V2-common electrode voltage Vcom| with respect to the common electrode voltage Vcom. Finally, determining whether the detection picture for line broken of common electrode line becomes abnormal, if so, it shows that line broken fault of common electrode line exists in the liquid crystal display, if not, it shows that line broken fault of common electrode line does not exist in the liquid crystal display. Said abnormal described in the present embodiment represents that a black line or white line gradually changed in horizontal direction appears in the detection picture for line broken of common electrode line, or represents the case where one half is white line gradually changed in horizontal direction and the other half is black line gradually changed in horizontal direction along the same pixel row.

In the above technical solution of the present embodiment, the voltage difference between the second pixel electrode voltage V2 and the common electrode voltage Vcom is the charging voltage difference A of the storage capacitor corresponding to the pixel electrode with positive polarity, the voltage difference between the first pixel electrode voltage V1 and the common electrode voltage Vcom is the discharging voltage difference B of the storage capacitor corresponding to the pixel electrode with negative polarity. Since the discharging voltage difference B is larger than the charging voltage difference A, that is, the overall strength for discharge is increased and the overall strength for discharge is decreased in the same detection picture for line broken of common electrode line, with the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily recognized.

In the above technical solution of the present embodiment, the difference value between the discharging voltage difference B and the charging voltage difference A should be made as large as possible, preferably, one could set that discharging voltage difference B=(1.5~3.5)×charging voltage difference A, at this time, the gray level presented by the pixel electrode with positive polarity is L0~L130, while the gray level presented by the pixel electrode with negative polarity is L63~L150. Further preferably, discharging voltage difference B=2×charging voltage difference A, at this time, the gray level presented by the pixel electrode with positive polarity is L0, while the gray level presented by the pixel electrode with negative polarity is L100.

FIG. 7 is a schematic diagram of detection picture for line broken of common electrode lines in the third embodiment of the method for detecting line broken faults of common electrode lines of the liquid crystal display. As shown in FIG. 7, the detection picture for line broken of common electrode line in the present embodiment is a type of "the mode of reversed each dot and each frame". For example, with respect to the same pixel column such as the red pixel R of the first column, the first pixel row L1 is positive polarity, the second pixel row L2 is negative polarity, and the third pixel row L3 is positive polarity, the fourth pixel row L4 is negative polarity; with respect to the same pixel row such as the fifth pixel row L5, the red pixel R of the first column is positive polarity, the green pixel G of the second column is negative polarity, and the blue pixel B of the third column is positive polarity; the polarity of each pixel electrode in the present frame would be changed in the next frame, for example, the red pixel R of the first column in the sixth pixel row L6 is negative polarity in the present frame, which would change to positive polarity in the next frame. Since the overall strength for discharge is increased and the overall strength for charge is decreased in the present embodiment, a second pixel electrode voltage V2 is applied to the pixel electrode with positive polarity, and |the second pixel electrode voltage V2-common electrode voltage Vcom| is smaller, such that the gray level presented by the pixel electrode with positive polarity is L0~L130, thus the pixel electrode with positive polarity in the picture of the present frame are all displayed as more black or fully black, for example, in the seventh pixel row L7, the red pixel R of the first column, the blue pixel B of the third column, and the green pixel G of the fifth column and so on are all displayed more black or fully black. In the picture of the present frame, a first pixel electrode voltage V1 is applied to the pixel electrode with negative polarity, such that the gray level presented by the pixel electrode with negative polarity is L63~L150, thus the pixel electrode with negative polarity is displayed in a color with a certain gray level, for example, in the seventh pixel row L7, the green pixel G of the second column is still displayed in green, the red pixel R of the fourth column is still displayed in red, and the blue pixel B of the sixth column is still displayed in blue and so on.

The implement method of the present embodiment is substantially the same as aforementioned first embodiment, with details omitted.

The Fourth Embodiment

FIG. 8 is a flow diagram illustrating a fourth embodiment of the method for detecting line broken faults of common electrode lines of the liquid crystal display, including:

step 41, loading a detection picture to a liquid crystal display, wherein said detection picture comprises at least one detection picture for line broken of common electrode lines, which has following features: in the detection picture of the same frame under the normal black mode, the second pixel electrode voltage V2 is applied to the pixel electrode with negative polarity, and the first pixel electrode voltage V1 is applied to the pixel electrode with positive polarity, |the first pixel electrode voltage V1-common electrode voltage Vcom|>|the second pixel electrode voltage V2-common electrode voltage Vcom| with respect to the common electrode voltage Vcom;

step 42, when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

The present embodiment is a method wherein the detection is performed for the line broken faults of common electrode lines under the normal black mode, the flow of the technical solution of the present embodiment is substantially the same as aforementioned third embodiment, however, in present embodiment, the second pixel electrode voltage V2 is applied to the pixel electrode with negative polarity, and the first pixel electrode voltage V1 is applied to the pixel electrode with positive polarity, |the first pixel electrode voltage V1-common electrode voltage Vcom|>|the second pixel electrode voltage V2-common electrode voltage Vcom| with respect to the common electrode voltage Vcom.

In the above technical solution of the present embodiment, the voltage difference between the second pixel electrode voltage V2 and the common electrode voltage Vcom is the discharging voltage difference B of the storage capacitor corresponding to the pixel electrode with negative polarity, the voltage difference between the first pixel electrode voltage V1 and the common electrode voltage Vcom is the charging voltage difference A of the storage capacitor corresponding to the pixel electrode with positive polarity. Since the charging voltage difference A is larger than the discharging voltage difference B, that is, the overall strength for charge is increased and the overall strength for discharge is decreased in the same detection picture for line broken of common electrode line, with the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily recognized.

In the above technical solution of the present embodiment, the difference value between the charging voltage difference A and the discharging voltage difference B should be made as large as possible, preferably, one could set that charging voltage difference A=(1.5~3.5)×discharging voltage difference B, at this time, the gray level presented by the pixel electrode with negative polarity is L0~L130, while the gray level presented by the pixel electrode with positive polarity is L63~L150. Further preferably, charging voltage difference A=2×discharging voltage difference B, at this time, the gray level presented by the pixel electrode with negative polarity is L0, while the gray level presented by the pixel electrode with positive polarity is L100.

Figure 9:
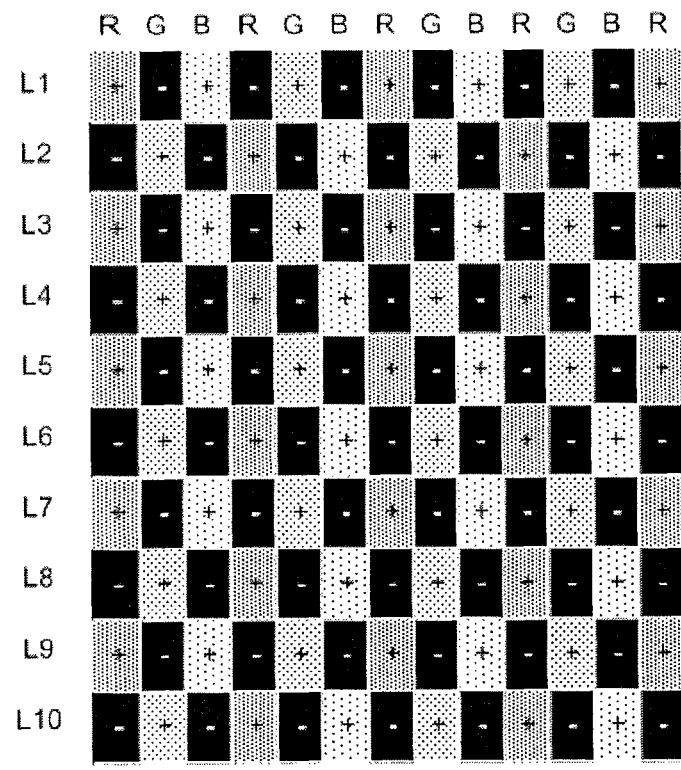
FIG. 9 is a schematic diagram of detection picture for line broken of common electrode lines in the fourth embodiment of the method for detecting line broken faults of common electrode lines of the liquid crystal display.
Figure 10:
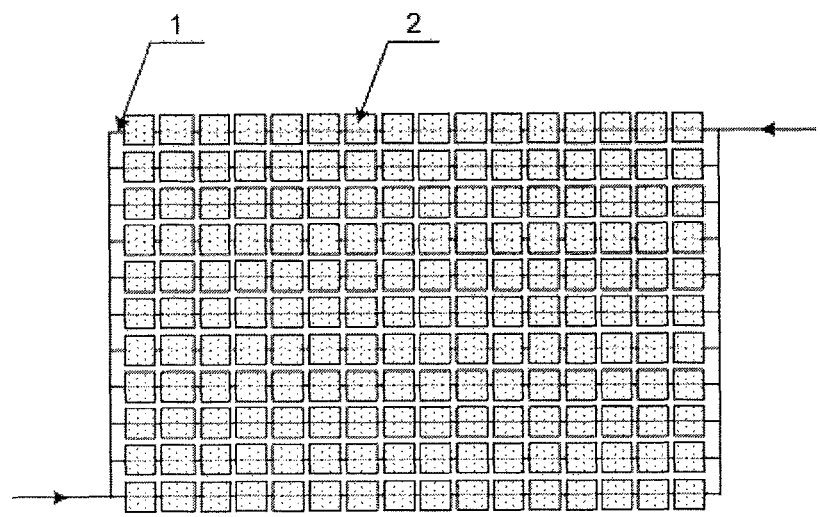
FIG. 10 is a schematic diagram of the structure of the common electrode lines on the array substrate in the related art.

FIG. 9 is a schematic diagram of detection picture for line broken of common electrode lines in the fourth embodiment of the method for detecting line broken faults of common electrode lines of the liquid crystal display. As shown in FIG. 9, the detection picture for line broken of common electrode line in the present embodiment is a type of "the mode of reversed each dot and each frame". For example, with respect to the same pixel column such as the red pixel R of the first column, the first pixel row L1 is positive polarity, the second pixel row L2 is negative polarity, and the third pixel row L3 is positive polarity, the fourth pixel row L4 is negative polarity; with respect to the same pixel row such as the fifth pixel row L5, the red pixel R of the first column is positive polarity, the green pixel G of the second column is negative polarity, and the blue pixel B of the third column is positive polarity; the polarity of each pixel electrode in the present frame would be changed in the next frame, for example, the red pixel R of the first column in the sixth pixel row L6 is negative polarity in the present frame, which would change to positive polarity in the next frame. Since the overall strength for charge is increased and the overall strength for discharge is decreased in the present embodiment, a second pixel electrode voltage V2 is applied to the pixel electrode with negative polarity, and |the second pixel electrode voltage V2-common electrode voltage Vcom| is smaller, such that the gray level presented by the pixel electrode with negative polarity is L0~L130, thus the pixel electrode with negative polarity in the picture of the present frame are all displayed as more black or fully black, for example, in the seventh pixel row L7, the green pixel G of the second column, the red pixel R of the fourth column, and the blue pixel B of the sixth column and so on are all displayed more black or fully black. In the picture of the present frame, a first pixel electrode voltage V1 is applied to the pixel electrode with positive polarity, such that the gray level presented by the pixel electrode with positive polarity is L63~L150, thus the pixel electrode with positive polarity is displayed in a color with a certain gray level, for example, in the seventh pixel row L7, the red pixel R of the first column is still displayed in red, the blue pixel B of the third column is still displayed in blue, and the green pixel G of the fifth column is still displayed in green and so on.

An embodiment of the present invention provides a method for detecting line broken faults of common electrode lines of the liquid crystal display by the aforementioned embodiments, regarding the array substrate structure of a storage capacitor on common (Cst on common) electrode line, the change in the common electrode signal of the common electrode line is strengthened by controlling the gray levels of the pixel electrodes with different polarities based on the polarity inversion mode of the pixel electrodes. In particular, in the same detection picture for line broken of common electrode line, an embodiment of the present invention a first pixel electrode voltage is applied to the pixel electrode with one polarity, and a second pixel electrode voltage is applied to the pixel electrode with another polarity, such that one of the overall strength for charge and overall strength for discharge is increased and the other is decreased, thereby affected by the capacitor effect between the pixel electrode and the common electrode line, the change in the common electrode signal of the common electrode line is enlarged, which increases the difference of the common electrode signal at line broken of the common electrode line comparing to that of the other common electrode lines without line broken, therefore distinct black line or white line gradually changed in horizontal direction appears in the detection picture for line broken of common electrode line and it is easily recognized. The line broken fault of common electrode lines could be detected by adopting the method for detecting line broken faults of common electrode lines of the liquid crystal display according to an embodiment of the present invention, so as to not only ensure being repaired in time and being processed respectively, but also avoid the waste of the subsequent process and materials, and further prevent the quality from degradation when used by the consumer.

Finally, it should be noted that, the above embodiments are used to explain the technical solution of the present invention and the present invention should not be construed as being limited to such embodiments, although the present invention has been described in detail with reference to preferred embodiments thereof, it will be understood by those of ordinary skill in the art that various changes or equivalent replacements may be made to the technical solution of the present invention without departing from the spirit and scope of the present invention as defined by the following claims.

What is claimed is:

1. A method for detecting line broken faults of common electrode lines of a liquid crystal display, comprising the steps of:
    loading a detection picture to a liquid crystal display, wherein said detection picture comprises at least one detection picture for line broken of common electrode lines, which has following features: in the detection picture of the same frame, a voltage difference of a storage capacitor corresponding to a pixel electrode with one polarity is larger than a voltage difference of a storage capacitor corresponding to a pixel electrode with another polarity;
    when the detection picture for line broken of common electrode line is displayed on the liquid crystal display, detecting whether there is a black line or white line gradually changed in horizontal direction in said detection picture for line broken of common electrode line, and determining line broken fault of common electrode line exists in the liquid crystal display when there is a black line or white line gradually changed in horizontal direction.

2. The method for detecting line broken faults of common electrode lines of a liquid crystal display as claimed in claim 1, said detection picture for line broken of common electrode line has following features: in the detection picture of the same frame under the normal white mode, a first pixel electrode voltage is applied to the pixel electrode with positive polarity, and a second pixel electrode voltage is applied to the pixel electrode with negative polarity, and |the first pixel electrode voltage-common electrode voltage|>|the second pixel electrode voltage-common electrode voltage|.

3. The method for detecting line broken faults of common electrode lines of a liquid crystal display as claimed in claim

2, the relationship between the first pixel electrode voltage and the second pixel electrode voltage is: |the first pixel electrode voltage-common electrode voltage|=(1.5 to 3.5)× |the second pixel electrode voltage-common electrode voltage|.

4. The method for detecting line broken faults of common electrode lines of a liquid crystal display as claimed in claim 3, the relationship between the first pixel electrode voltage and the second pixel electrode voltage is: |the first pixel electrode voltage-common electrode voltage|=2×|the second pixel electrode voltage-common electrode voltage|.

5. The method for detecting line broken faults of common electrode lines of a liquid crystal display as claimed in claim 4, the gray level presented by the pixel electrode with the polarity corresponding to the first pixel electrode voltage is L0, while the gray level presented by the pixel electrode with the polarity corresponding to the second pixel electrode voltage is L100, or the gray level presented by the pixel electrode with the polarity corresponding to the second pixel electrode voltage is L0, while the gray level presented by the pixel electrode with the polarity corresponding to the first pixel electrode voltage is L100.

6. The method for detecting line broken faults of common electrode lines of a liquid crystal display as claimed in claim 3, the gray level presented by the pixel electrode with the polarity corresponding to the first pixel electrode voltage is L0 to L130, while the gray level presented by the pixel electrode with the polarity corresponding to the second pixel electrode voltage is L63 to L150.

7. The method for detecting line broken faults of common electrode lines of a liquid crystal display as claimed in claim 3, the gray level presented by the pixel electrode with the polarity corresponding to the second pixel electrode voltage is L0 to L130, while the gray level presented by the pixel electrode with the polarity corresponding to the first pixel electrode voltage is L63 to L150.

8. The method for detecting line broken faults of common electrode lines of a liquid crystal display as claimed in claim 1, said detection picture for line broken of common electrode line has following features: in the detection picture of the same frame under the normal white mode, a first pixel electrode voltage is applied to the pixel electrode with negative polarity, and a second pixel electrode voltage is applied to the pixel electrode with positive polarity, and |the first pixel electrode voltage-common electrode voltage|>|the second pixel electrode voltage-common electrode voltage|.

9. The method for detecting line broken faults of common electrode lines of a liquid crystal display as claimed in claim 2, the relationship between the first pixel electrode voltage and the second pixel electrode voltage is: |the first pixel electrode voltage-common electrode voltage|=(1.5 to 3.5)× |the second pixel electrode voltage-common electrode voltage|.

10. The method for detecting line broken faults of common electrode lines of a liquid crystal display as claimed in claim 1, said detection picture for line broken of common electrode line has following features: in the detection picture of the same frame under the normal black mode, a second pixel electrode voltage is applied to the pixel electrode with positive polarity, and a first pixel electrode voltage is applied to the pixel electrode with negative polarity, and |the first pixel electrode voltage-common electrode voltage|>|the second pixel electrode voltage-common electrode voltage|.

11. The method for detecting line broken faults of common electrode lines of a liquid crystal display as claimed in claim 2, the relationship between the first pixel electrode voltage and the second pixel electrode voltage is: |the first pixel electrode voltage-common electrode voltage|=(1.5 to 3.5)× |the second pixel electrode voltage-common electrode voltage|.

12. The method for detecting line broken faults of common electrode lines of a liquid crystal display as claimed in claim 1, said detection picture for line broken of common electrode line has following features: in the detection picture of the same frame under the normal black mode, a second pixel electrode voltage is applied to the pixel electrode with negative polarity, and a first pixel electrode voltage is applied to the pixel electrode with positive polarity, and |the first pixel electrode voltage-common electrode voltage|>|the second pixel electrode voltage-common electrode voltage|.

13. The method for detecting line broken faults of common electrode lines of a liquid crystal display as claimed in claim 2, the relationship between the first pixel electrode voltage and the second pixel electrode voltage is: |the first pixel electrode voltage-common electrode voltage|=(1.5 to 3.5)× |the second pixel electrode voltage-common electrode voltage|.

* * * * *